(12) United States Patent
Hamada et al.

(10) Patent No.: US 6,186,538 B1
(45) Date of Patent: Feb. 13, 2001

(54) AIR BAG CONTROL SYSTEM FOR PASSENGER SEATS

(75) Inventors: Makoto Hamada; Akihiro Osanai; Yoshiaki Inoue, all of Toyota; Minoru Izawa, Okazaki, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/049,984

(22) Filed: Mar. 30, 1998

(30) Foreign Application Priority Data

Apr. 1, 1997 (JP) .................................................. 9-082899

(51) Int. Cl.[7] .................................................. B60R 21/32
(52) U.S. Cl. .................. 280/735; 280/728.2; 280/728.3; 280/730.1; 280/730.2
(58) Field of Search .............................. 280/728.2, 728.3, 280/732, 735, 730.2, 730.1, 752, 753

(56) References Cited

U.S. PATENT DOCUMENTS

| | | |
|---|---|---|
| 4,186,941 | 2/1980 | Scholz et al. . |
| 5,071,160 | 12/1991 | White et al. . |
| 5,232,243 | 8/1993 | Blackburn et al. . |
| 5,330,226 | 7/1994 | Gentry et al. . |
| 5,366,241 | 11/1994 | Kithil . |
| 5,398,185 | 3/1995 | Omura . |
| 5,413,378 | 5/1995 | Steffens, Jr. et al. . |
| 5,439,249 | 8/1995 | Steffens et al. . |
| 5,494,311 | 2/1996 | Blackburn et al. . |
| 5,528,698 | 6/1996 | Kamei et al. . |
| 5,531,472 | 7/1996 | Semchena et al. . |
| 5,573,269 | 11/1996 | Gentry et al. . |
| 5,612,876 | 3/1997 | Zeidler et al. . |
| 5,624,132 | 4/1997 | Blackburn et al. . |
| 5,626,359 | 5/1997 | Steffens, Jr. et al. . |
| 5,653,462 | 8/1997 | Breed et al. . |
| 5,702,123 | 12/1997 | Takahashi et al. . |

FOREIGN PATENT DOCUMENTS

| | | |
|---|---|---|
| 1-125755 | 8/1989 | (JP) . |
| 2-60858 | 3/1990 | (JP) . |
| 2-293234 | 12/1990 | (JP) . |
| 3-233391 | 10/1991 | (JP) . |
| 4-4288 | 1/1992 | (JP) . |
| 4-262941 | 9/1992 | (JP) . |

OTHER PUBLICATIONS

Patent Abstract of Japan, Publication No. 08268220 A, Oct. 15, 1996, H. Takahashi et al,.
Magazin Technik, Drucksache, p. 96, 22/1994.

Primary Examiner—Lanna Mai
Assistant Examiner—To Toan
(74) Attorney, Agent, or Firm—Pillsbury Madison & Sutro LLP

(57) ABSTRACT

An air bag control system for passenger seat has a seated-state detection sensor provided in a seat, a proximity sensor that detects an object near an air bag apparatus, and an impact sensor that detects a deceleration at the time of an impact. If there is no detection made by the proximity sensor for a predetermined length of time after the seated-state detection sensor detects the seating of an occupant, a control device keeps the air bag apparatus in an operable state after elapse of the predetermined length of time. If there is no detection made by the proximity sensor for the predetermined length of time after the seated-state detection sensor makes detection, the control device ignores an on-state of the proximity sensor or a signal from the proximity sensor, and keeps the air bag apparatus in the operable state. With this control, even if a sitting adult extends his/her arm to an instrument panel after elapse of the predetermined length of time, the air bag apparatus is operated when the impact sensor detects a deceleration equal to or greater than a predetermined value.

16 Claims, 8 Drawing Sheets

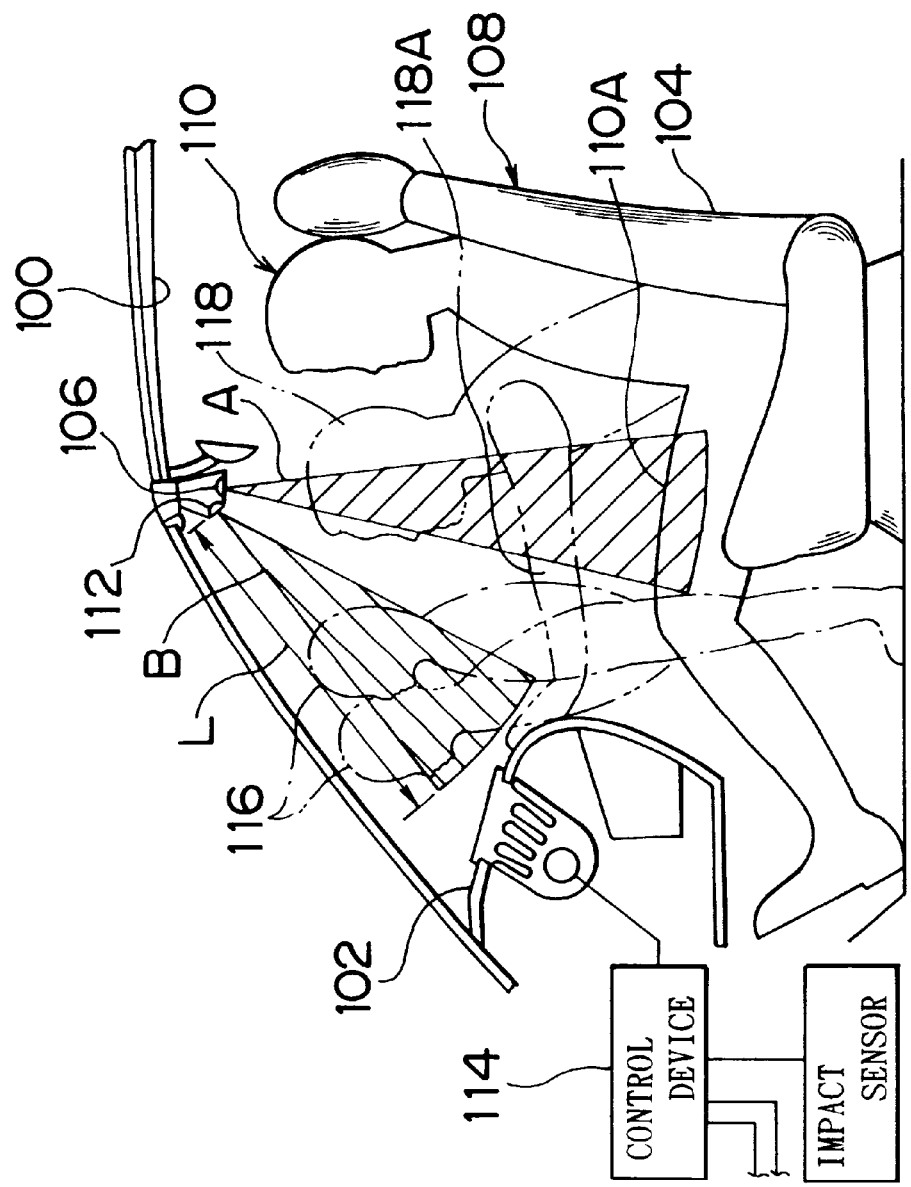

AIR BAG CONTROL SYSTEM FOR PASSENGER SEATS

The disclosure of Japanese Patent Application No. Hei 9-82899 filed on Apr. 1, 1997 including the specification, drawings and abstract is incorporated herein by reference in its entirety.

BACKGROUND OF THE INVENTION

1. Field of the invention

The present invention relates to an air bag control system for passenger seats and, more particularly, to an air bag control system for passenger seats for controlling the deployment of an air bag in correspondence with the conditions of an occupant in the passenger seat.

2. Description of Related Art

It is known to equip vehicles with an air bag control system for passenger seats for protecting an occupant in the passenger seat at the time of an emergency. Such a control system is described in Japanese patent application laid-open No. Hei 8-268220, which as filed in the U.S. issued as U.S. Pat. No. 5,702,123.

An air bag control system for passenger seats, as shown in FIG. 8 and described in detail in that U.S. Pat. No. 5,702,123, has an occupant detecting sensor 106 that is mounted on a ceiling 100. The mount position of the occupant detecting sensor 106 is above a point between an instrument panel 102 and a seat back 104. The detection area A of the occupant detecting sensor 106 extends over legs 110A of an occupant 110 seated in a passenger seat 108. An approach detecting sensor 112 is provided forward from the occupant detecting sensor 106. The detection area B of the approach detecting sensor 112 extends above the instrumental panel 102, that is, to a position that is a predetermined distance apart therefrom. If the distance detected by the approach detecting sensor 112 is at most a predetermined distance L, an air bag control circuit 114 determines that a child 116 is in a standing posture. If the detected distance is greater than the predetermined distance L, the air bag control circuit 114 determines that an adult 118 has stretched out his/her arm 118A to the instrument panel 102 (that is, a protective arm position).

With regard to such an air bag control system for passenger seats, there is a need for more reliable determination on the sitting or standing conditions of the adult 118 and the child 116 in the vehicle in order to achieve optimal occupant protection.

SUMMARY OF THE INVENTION

Accordingly, it is an object of the present invention to provide an air bag control system for passenger seats that reliably determines the sitting/standing conditions of an occupant and therefore appropriately controls an air bag apparatus.

To achieve the objects of the invention, according to a first aspect of the invention, there is provided an air bag control system for passenger seats that includes a seated-state detection sensor provided in a seat, a proximity sensor that detects an object near an air bag apparatus, and an impact sensor that detects a deceleration at the time of an impact. If there is no detection made by the proximity sensor for a predetermined length of time after the seated-state detection sensor detects the seating of an occupant, after elapse of that predetermined length of time a control base keeps the air bag apparatus in an operable state in which the air bag apparatus can be operated in response to detection of the deceleration by the impact sensor.

According to a second aspect of the invention, an air bag control system for passenger seats based on the first aspect may further include an auxiliary proximity sensor disposed at a forward position in an upper surface of an instrument panel, the forward position being near a windshield pane. The auxiliary proximity sensor has a detection area that extends rearwardly. In this mode, giving a highest priority to detection made by the auxiliary proximity sensor, the control device sets the air bag apparatus in an operation prevented state.

According to a third aspect of the invention, an air bag control system for passenger seats based on the first aspect may further include an auxiliary seated-state detection sensor provided in a forward portion of a seat cushion, and an inflator controllable in a plurality of steps between a high pressure and a low pressure. In this arrangement, the seated-state detection sensor is provided in a rearward portion of the seat cushion. If each of the seated-state detection sensor and the auxiliary seated-state detection sensor detects a seated state, the control device determines that an adult is seated on the seat cushion in a normal sitting posture, and operates the inflator at a relatively high pressure. If the seated-state detection sensor detects a seated-state and the auxiliary seated-state detection sensor does not detect a seated state, the control device determines that a child is seated on the seat cushion in a normal sitting posture, and operates the inflator at a relatively low pressure or prevents operation of the inflator.

According to a fourth aspect of the invention, an air bag control system is provided for passenger seats including at least one of a shoulder posture detection sensor provided in an upper portion of a seat back for detecting a shoulder portion of an occupant, and a head posture detection sensor provided in a head rest for detecting a head portion of an occupant, and at least one of a hip-waist posture detection sensor provided in a lower portion of the seat back for detecting a hip-waist portion of an occupant, and a buttock sensor provided in a rear portion of a seat cushion for detecting a buttock portion of an occupant. A control device is provided for determining whether an occupant is seated and correspondingly controlling operation of the air bag, on the basis of a combination of a signal from at least one of the shoulder posture detection sensor and head posture detection sensor and a signal from at least one of the hip-waist posture detection sensor and the buttock sensor.

In the first aspect of the invention, the control device performs control based on a combination of signals from the seated-state detection sensor and the proximity sensor. That is, if there is no detection made by the proximity sensor for a predetermined length of time after the seated-state detection sensor detects the seating of an occupant, the control device keeps the air bag apparatus in the operable state in which the air bag apparatus can be operated in response to detection of the deceleration by the impact sensor, after elapse of the predetermined length of time. Therefore, it becomes possible to determine reliably the state of an occupant in a vehicle (i.e., standing or sitting) taking into consideration an adult arm protective state, a state in which a child seat is set facing rearward, and the like, and therefore appropriately control the air bag apparatus.

In the second aspect of the invention, the control device performs control based on a detection signal from the auxiliary proximity sensor, without being affected by the state detected by the seated-state detection sensor. That is, merely if a portion of an occupant or the like is present in the detection area of the auxiliary proximity sensor extending rearwardly, the control device sets the air bag apparatus in the operation prevented state. Therefore, it is possible to reliably determine a state of an occupant in a vehicle, such as a leaning posture of an adult, and the like, and therefore appropriately control the air bag apparatus.

In the third aspect of the invention, since the seated-state detection sensor detects an occupant and the auxiliary seated-state detection sensor detects a difference between or distinguishes the pressures applied to the seat cushion from thigh portions of different occupants, such as an adult, a child and the like, it is possible to distinguish clearly an adult from a child. The auxiliary seated-state detection sensor may be on/off switch that switches on based on a preset pressure. Thereby, the system construction can be simplified.

Furthermore, in the third aspect, a set detection pressure of the auxiliary seated-state detection sensor may be higher than a set detection pressure of the first seated-state detection sensor. This construction makes it possible to detect reliably a difference between or distinguish the pressures applied to the seat cushion from the thigh portions of different occupants on the basis of the detection signal from the auxiliary seated-state detection sensor. Therefore, it becomes possible to distinguish more clearly an adult from a child.

The auxiliary seated-state detection sensor may be disposed at a position between 150 mm and 250 mm from a forward end of the seat cushion, with a detection pressure of the auxiliary seated-state detection sensor set to 120 $g/cm^2$–180 $g/cm^2$. This construction makes it possible to detect more reliably a difference between or distinguish the pressures applied to the seat cushion from the thigh portions of different occupants and therefore more clearly distinguish an adult from a child.

An alarm device may be provided which is operated by the control device if the control device determines that an child is seated in a normal sitting posture on the seat cushion. Therefore, if a child is in a passenger seat, the air bag control system for passenger seat can advise that the child be moved to a rear seat.

The air bag control system for passenger seats may further have a construction as follows. A belt-set sensor is provided which detects a fastened state of a seat belt and outputs to the control device a signal indicating whether the seat belt is fastened. If the control device determines that a child is seated in the normal sitting posture on the seat cushion and that the seat belt is fastened, the control device operates the inflator at a relatively low pressure. The control device prevents operation of the inflator if the control device determines that a child is seated in the normal sitting posture on the seat cushion and that the seat belt is not set. By the control of the inflator in accordance with whether the seat belt is fastened on a child, it becomes possible to achieve optimal protection of a child occupant.

The air bag control system for passenger seats may further have another construction as follows. A belt-set sensor is provided which detects a set state of a seat belt and outputs to the control device a signal indicating whether the seat belt is set. If the control device determines that an adult is seated in the normal sitting posture on the seat cushion and that the seat belt is fastened, the control device operates the inflator at a relatively high pressure. If the control device determines that an adult is seated in the normal sitting posture on the seat cushion and that the seat belt is not fastened, the control device operates the inflator at a relatively low pressure. By the control of the operating pressure on the inflator in accordance with whether the seat belt is set on an adult, it becomes possible to achieve optimal protection of an adult occupant.

The air bag control system for passenger seats may further have still another construction as follows. A belt-set sensor is provided which detects a fastened state of a seat belt and outputs to the control device a signal indicating whether the seat belt is fastened. The control device performs control such that the inflator is operated at a relatively high pressure only in a case where it is determined by the control device that an adult is seated in the normal sitting posture on the seat cushion and that the seat belt is fastened and, on the basis of the signal from the impact sensor, that a strong impact has occurred. By limiting the conditions for operating the inflator at the relatively high pressure in this manner, it becomes possible to achieve optimal protection of an adult occupant.

In the fourth aspect of the invention, the control device makes a determination regarding the seating of an occupant based on a combination of a signal from at least one of the shoulder posture detection sensor and the head posture detection sensor and a signal from at least one of the hip-waist posture detection sensor and the buttock sensor, and correspondingly controls the operation of the air bag apparatus. Due to the two lines of control, it becomes possible to detect reliably the sitting states of an occupant, and determine how the occupant is seated, and therefore appropriately control the air bag apparatus. Provision of the various sensors enables detection of various sitting postures of an occupant. Based on the detected sitting posture, the air bag apparatus can be appropriately controlled.

Each of the shoulder posture detection sensor, the head posture detection sensor and the hip-waist posture detection sensor may be one of an electric capacity type sensor and an electrostatic capacity type sensor. With this construction, each of the shoulder posture detection sensor, the head posture detection sensor and the hip-waist posture detection sensor detects approach of a body on the basis of disturbance of an electric field around the sensor caused by the presence of the body because it contains water. Therefore, precise detection by the sensors becomes possible even if a cover is placed on the seat cushion, the seat back or the head rest.

In the fourth aspect of the invention, a proximity sensor may be provided which detects an object near an air bag apparatus. In this construction, if the proximity sensor detects an object near the air bag apparatus, the control device normally prevents operation of the air bag apparatus. However, if any of the shoulder posture detection sensor, the head posture detection sensor, the hip-waist posture detection sensor and the buttock sensor makes detection, the control device gives priority to detection signals from the shoulder posture detection sensor, the head posture detection sensor, the hip-waist posture detection sensor and the buttock sensor, over a detection signal from the proximity sensor, and sets the air bag apparatus in the operable state. Therefore, the air bag apparatus can be more appropriately controlled.

Furthermore, the air bag control system for passenger seats may also have a construction as follows. Under a situation that neither the shoulder posture detection sensor nor the head posture detection sensor makes detection, if the proximity sensor does not make detection for a predetermined length of time after the hip-waist posture detection sensor and the buttock sensor make detection, the control device determines that an occupant is seated in the normal sitting posture on the seat cushion and performs control such that the air bag apparatus is maintained in the operable state. Therefore, the air bag apparatus can be more appropriately controlled.

BRIEF DESCRIPTION OF THE DRAWINGS

The above and other objects, features and advantages of the present invention will become more apparent from the following detailed description of preferred embodiments when read in conjunction with the accompanying drawings, wherein like numerals are used to represent like elements and wherein:

FIG. 8 is a schematic side view illustrating a conventional air bag control system for a passenger seat.

DETAILED DESCRIPTION OF PREFERRED EMBODIMENTS

Preferred embodiments of the present invention is described in detail hereinafter with reference to the accompanying drawings.

First Embodiment

An air bag control system for passenger seats according to a first embodiment of the invention is described with reference to FIGS. 1 and 2.

Figure 1:
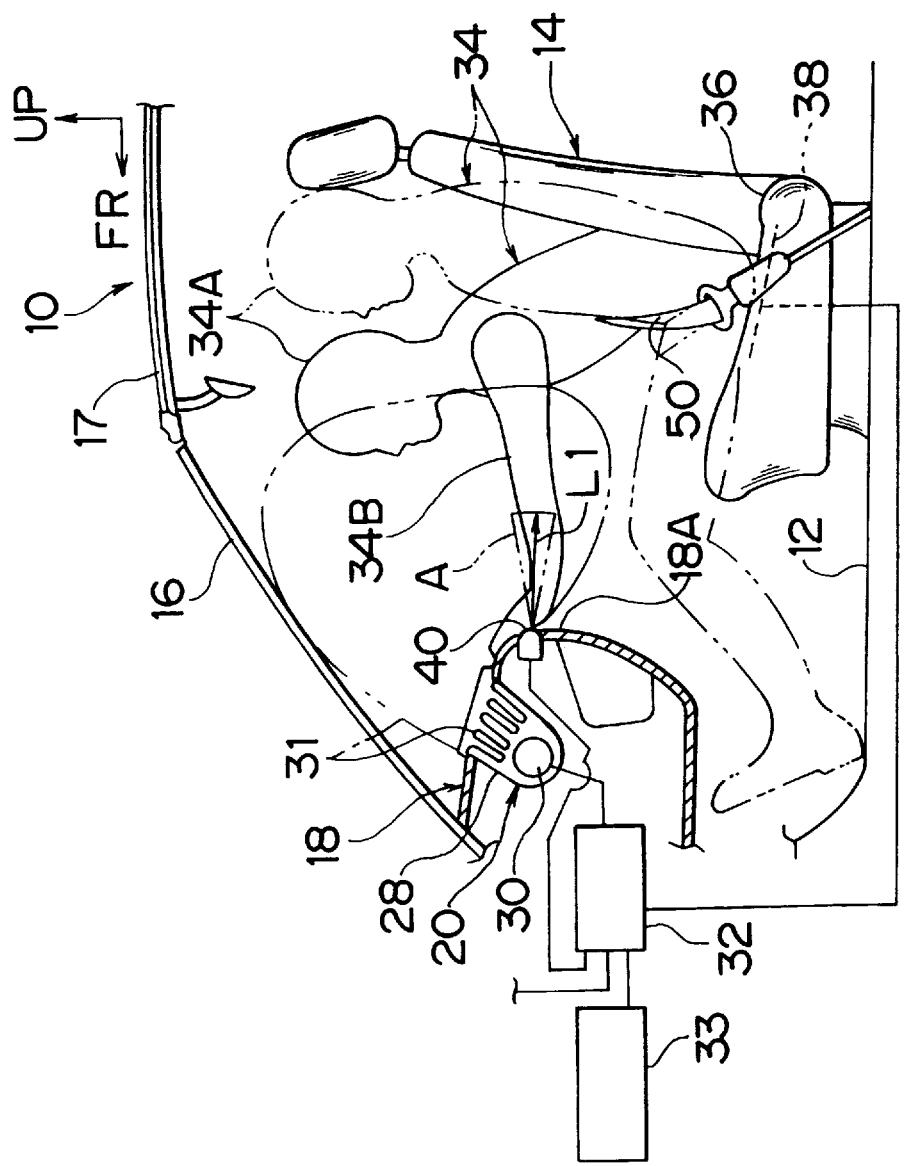
FIG. 1 is a schematic side view illustrating an air bag control system for a passenger seat according to a first embodiment of the invention.
Figure 2:
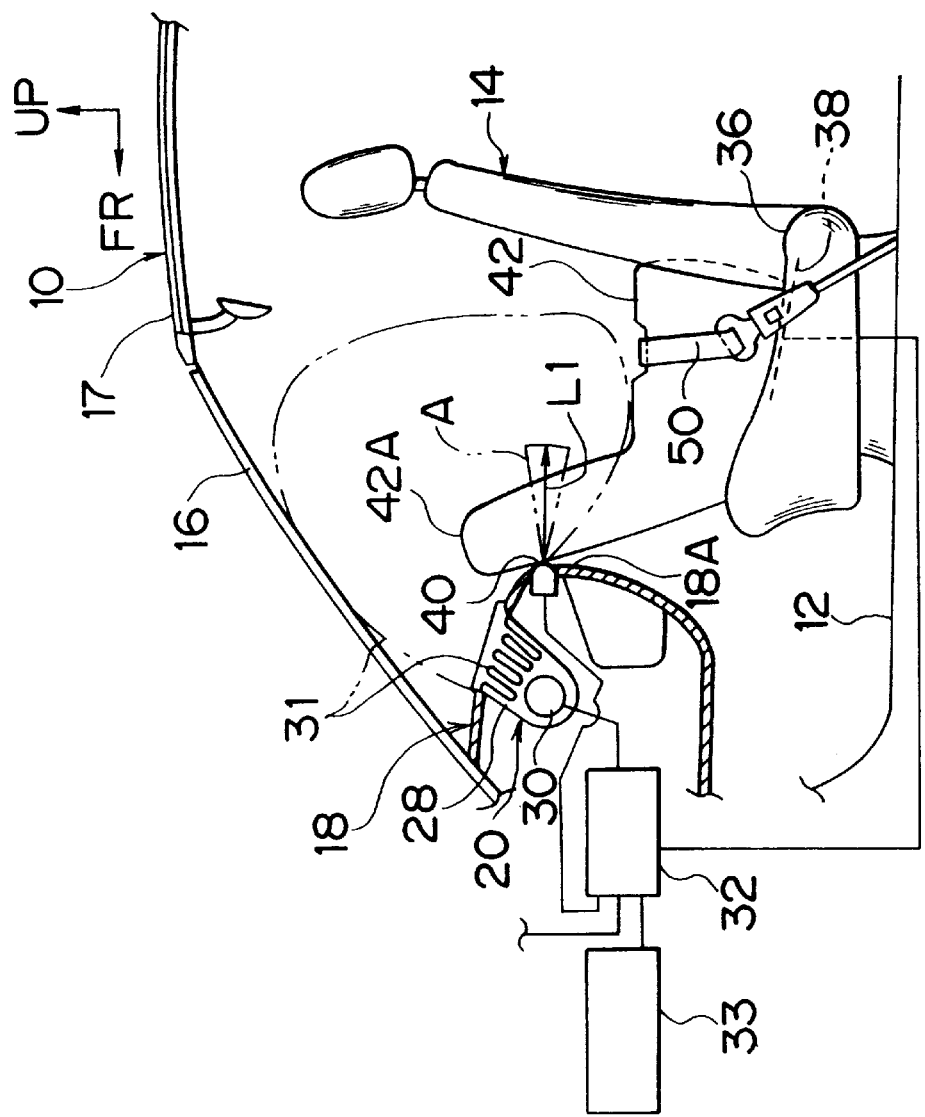
FIG. 2 is a schematic side view of the air bag control system for a passenger seat according to the first embodiment when a child seat is installed.

In FIGS. 1 and 2, arrow FR indicates the fore-to-aft direction relative to a vehicle, and arrow UP indicates the vertical direction relative to the vehicle.

In FIG. 1, a passenger seat 14 where an occupant sits is connected to a floor surface 12 of a vehicle 10 by a pair of right and left rails (not shown) extending parallel in the fore-to-aft direction, whereby the passenger seat 14 can be moved in the fore-to-aft direction relative to the floor surface 12. A windshield pane 16 is provided upwardly forward from the passenger seat 14. The windshield pane 16 is connected at one end thereof to a roof 17 and at another end thereof to a hood (not shown). An instrument panel 18 is disposed forward from the passenger seat 14, that is, between the windshield pane 16 and the floor surface 12. The instrument panel 18 is a synthetic resin-made member having a generally "U" sectional shape. The instrument panel 18 is mounted so that an opening of the generally "U"-shaped section faces toward the front of the vehicle.

An air bag apparatus 20 is disposed inside the instrument panel 18 as shown in FIG. 1 and FIG. 2. An air bag case 28 of the air bag apparatus 20 has a generally "U" sectional shape. The air bag case 28 is mounted so that an opening of the generally "U"-shaped section faces upwardly rearward relative to the vehicle. An inflator 30 is disposed in a bottom portion of the air bag case 28. An air bag 31 is housed in a folded state near the opening of the air bag case 28. When the inflator 30 generates gas, the air bag 31 is inflated and deployed from the opening of the air bag case 28 toward a head portion 34A of an adult occupant (hereinafter, referred to as "adult") 34 seated in a normal sitting posture.

The inflator 30 disposed in the air bag case 28 is connected to a control device, that is, an air bag control circuit 32 that includes a microcomputer. Connected to the air bag control circuit 32 is an impact sensor 33 for detecting a deceleration that acts on the vehicle at the time of an impact.

A seated-state sensor 38 is disposed in a rear portion of a seat cushion 36 of the passenger seat 14. The seated-state sensor 38 is also connected to the air bag control circuit 32. The seated-state sensor 38 is formed of a sheet-shaped pressure detecting sensor and is disposed in a reverse side of a shell of the seat cushion 36. The seated-state sensor 38 is a sensor that measures load, more specifically, detects various loads, including relatively low loads, so as to detect the loads from an adult, a child occupant (hereinafter, referred to as "child"), a child seat (child restraint system (CRS)) and the like.

A proximity sensor 40, formed of an ultrasonic wave sensor, is provided in a rear end portion 18A of the instrument panel 18, the rear end portion 18A being rearward relative to the vehicle. The proximity sensor 40 is connected to the air bag control circuit 32 and faces rearwardly. The proximity sensor 40 is constituted by a transmitter-receiver type sensor (not shown). A detection area A of the proximity sensor 40 extends from the instrument panel 18 to a position that is a predetermined distant L1 rearwardly from the instrument panel 18. That is, the proximity sensor 40 is designed to detect an arm 34B or the like of the adult 34 extended to the instrument panel 18 as indicated in FIG. 1.

Although not shown in the drawings, a retractor of a seat belt 50 is switchable between an automatic locking retractor (ALR) mode and an emergency locking retractor (ELR) mode. The seat belt retractor switches to the ELR mode if the adult 34 sits in the passenger seat 14. If a child seat 42 is fixed to the passenger seat 14 by the seat belt 50, the seat belt retractor switches to the ALR mode. The seat belt retractor is equipped with a retraction state detecting switch for detecting the child seat 42 in cooperation with the switching between the ALR and ELR modes. The retraction state detecting switch is connected to the air bag control circuit 32, and inputs thereto a signal indicating which of the modes, ALR or ELR, the seat belt retractor is in.

Figure 3:
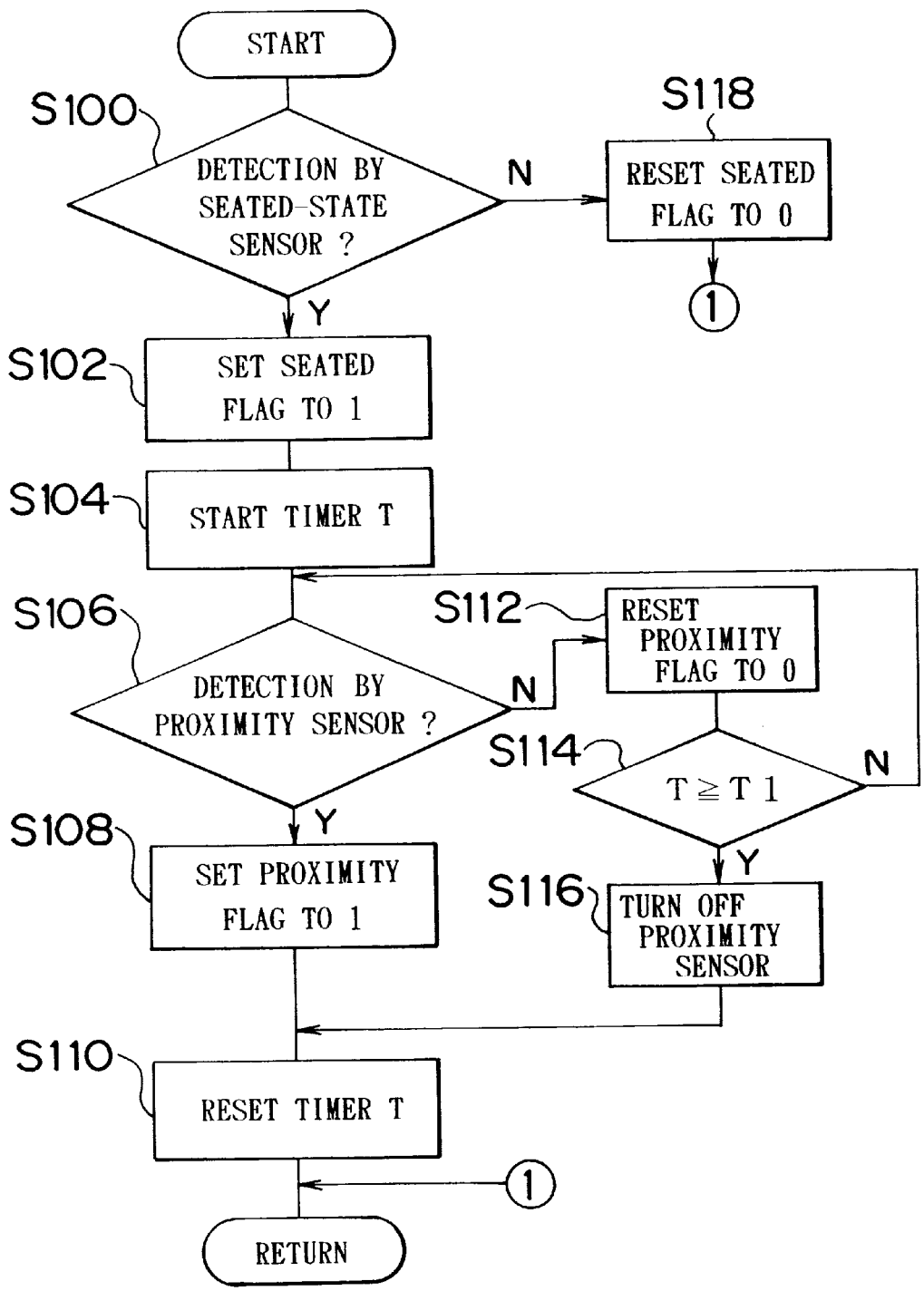
FIG. 3 is a flowchart illustrating a portion of an occupant detection control of the air bag control system for a passenger seat according to the first embodiment.

The operation of the first embodiment of the invention will be described with reference to the flowchart of FIG. 3.

In step (hereinafter, referred to as "S") 100, i.e., S100, the air bag control circuit 32 of the first embodiment determines whether an occupant is seated on the basis of an output from the seated-state sensor 38. If, at this moment, the adult 34 is seated on the seat cushion 36 of the passenger seat 14 as indicated in FIG. 1, the seated-state sensor 38 outputs a predetermined output to the air bag control circuit 32.

When the air bag control circuit 32 determines that the seated-state sensor 38 has detected a seated occupant on the basis of the output from the seated-state sensor 38, the air bag control circuit 32 sets a seated flag FT in S102.

Subsequently in S104, a timer T is started. In S106, it is determined whether the proximity sensor 40 has detected an occupant. If, at this moment, the adult 34 has been seated on the seat cushion 36 of the passenger seat 14 and has extended the arm 34B to the instrument panel 18, the proximity sensor 40 outputs a predetermined output to the air bag control circuit 32. Based on the output from the proximity sensor 40, the air bag control circuit 32 determines that the proximity sensor 40 has detected the occupant. In S108, a proximity flag FS is set. In S110, the timer T is reset. Conversely, if it is determined in S106 that the proximity sensor 40 has not detected the occupant, the operation proceeds to S112 where the proximity flag FS is reset. Subsequently in S114, it is determined whether the timer T has counted at least a predetermined length of time T1 (T1 is about 6 seconds). If it is determined in S114 that the timer T has counted at least the predetermined length of time T1 (T≧T1), the operation proceeds to S116 where the air bag control circuit 32 turns off a power line to the proximity sensor 40 or ignores the signal from the proximity sensor 40. The operation subsequently proceeds to S110. Conversely, if it is determined in step S114 that the timer T has not counted the predetermined length of time T1, the operation proceeds to S106.

If, in step S100, it is determined that an occupant is seated on the basis of the output from the seated-state sensor 38, the seated flag FT is reset in S118.

In the air bag control system for passenger seat according to the first embodiment described above, the air bag control circuit 32 performs control based on the combination of the seated-state sensor 38 and the proximity sensor 40. That is, the air bag control circuit 32 kills the signal from the proximity sensor 40 and keeps the air bag apparatus 20 in an operable state (standby state) if there is no detection by the proximity sensor 40 for the predetermined length of time T1 after the seated-state sensor 38 has detected a seated occupant.

The predetermined length of time T1 is determined considering a normal length of time for an occupant to sit at the time of entrance into the vehicle, including the time for fastening seat belt 50. It is considered that there is substantially no possibility that an occupant will extend his/her arm to the instrument panel 18 in this short length of time.

Therefore, if the adult 34 extends his/her arm 34B to the instrument panel 18 as indicated in FIG. 1 after the predetermined length of time T1 elapses without occupant detection being made by the proximity sensor 40, the air bag apparatus 20 remains in the operable state. That is, after the predetermined length of time T1, the air bag apparatus 20 can be operated to deploy the impact sensor 33 to protect the adult 34 regardless of the position of arm 34B, if the impact sensor 33 detects a predetermined deceleration or greater.

If a child is standing between the passenger seat 14 and the instrument panel 18, the seated-state sensor 38 does not detect an occupant in S100, but the proximity sensor 40 detects the child. Therefore, based on the signal from the proximity sensor 40, the air bag apparatus 20 can be set into to an operation prevented state.

If a child seat 42 is set on the seat cushion 36 in a rearward facing position as shown in FIG. 2, the proximity sensor 40 detects a seat back portion 42A of the child seat 42 approximately simultaneously with the detection of the child seat 42 by the seated-state sensor 38, that is, within the predetermined length of time T1 following detection by the seated-state sensor 38. Since the signal from the proximity sensor 40 is not suppressed in this case either, the air bag apparatus 20 is set in the operation prevented state based on the signal from the proximity sensor 40. This control operation is redundant with one of the control operations according to the first embodiment, that is, a control operation wherein the child seat 42 is detected on the basis of a signal from the retraction state detecting switch disposed in the retractor of the seat belt 50, in cooperation with the switching between the ALR and ELR modes and, thereby, the air bag apparatus 20 is set in the operation prevented state.

Therefore, the air bag control system for a passenger seat according to the first embodiment is able to determine reliably the state of an occupant in a vehicle and, therefore, is able to control the air bag apparatus appropriately.

Second Embodiment

An air bag control system for passenger seats according to a second embodiment of the invention is now described with reference to FIG. 4.

Members and portions of the second embodiment comparable to those of the first embodiment are represented by comparable reference characters and are not described again.

Figure 4:
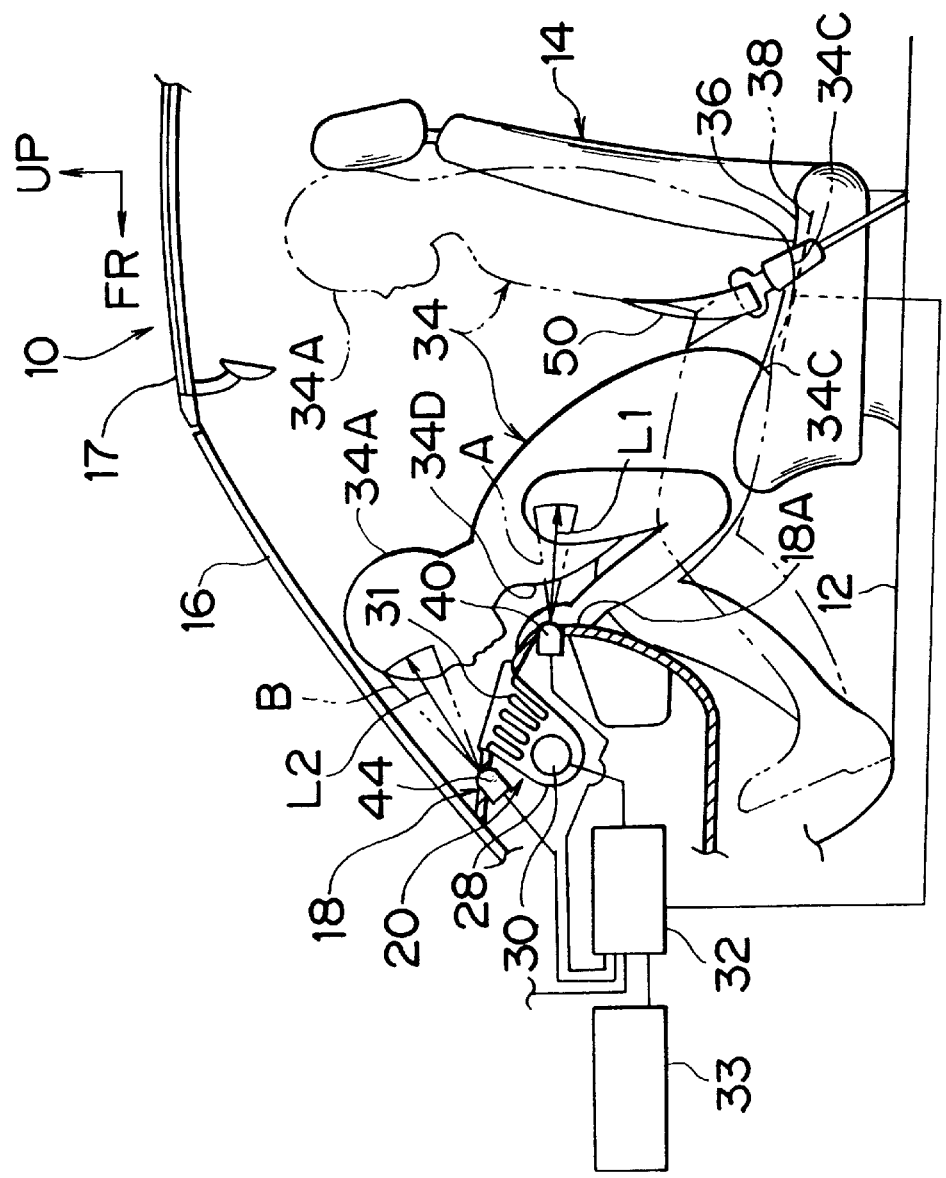
FIG. 4 is a schematic side view illustrating an air bag control system for a passenger seat according to a second embodiment of the invention.

In the FIG. 4 arrangement for an air bag control system for a passenger seat according to the second embodiment, an auxiliary proximity sensor 44 is disposed at a forward position in an upper surface of an instrument panel 18, that is, a position close to a the windshield pane 16, more specifically, at a position that an adult 34 cannot reach by a hand even when arm 34B of the adult 34 is extended to the instrument panel 18 as indicated in FIG. 1. The auxiliary proximity sensor 44 is connected to the air bag control circuit 32. The detection area B of the auxiliary proximity sensor 44 extends rearward over a predetermined distance L2, between a position forward from a rear end 18A of the instrument panel 18 and a position rearward from a rear end of opening of the air bag case 28. Therefore, if adult 34 leans forward so that the head portion 34A of the adult 34 comes near the air bag apparatus 20 as indicated by a solid line in FIG. 4, the auxiliary proximity sensor 44 detects the proximity of the head portion 34A.

The operation of the second embodiment is now described below.

When the adult 34 assumes a forward leaning posture as indicated by the solid line in FIG. 4 so that a buttock portion 34C of the adult 34 moves off of the seated-state sensor 38, the seated-state sensor 38 does not detect an occupant but the proximity sensor 40 detects a chest portion 34D of the adult 34. Based on the signals from the two sensors, the air bag control circuit 32 sets the air bag apparatus 20 in the operation prevented state. When the auxiliary proximity sensor 44 detects the head portion 34A of the adult 34, the air bag control circuit 32 gives priority to the signal from the auxiliary proximity sensor 44 over the signals from the seated-state sensor 38 and proximity sensor 40 in order to set the air bag apparatus 20 in the operation prevented state. That is, according to the second embodiment, the air bag control circuit 32 achieves redundant determination on the posture of an occupant based on the detection by the proximity sensor 40 and the detection by the auxiliary proximity sensor 44. If the auxiliary proximity sensor 44 detects the presence of a portion of the occupant in the detection area B extending between a position forward from a rear end 18A of the instrument panel 18 and a position rearward from a rear end of opening of the air bag case 28, the air bag control circuit 32 sets the air bag apparatus 20 in the operation prevented state on the basis of the detection signal from the auxiliary proximity sensor 44, without being affected by the detection state of the seated-state sensor 38 or the proximity sensor 40. Therefore, the second embodiment makes it possible to determine reliably the state of an occupant and appropriately control the air bag apparatus 20.

Third Embodiment

An air bag control system for passenger seats according to a third embodiment of the invention is now described with reference to FIGS. 5 and 6.

Members and portions of the third embodiment comparable to those of the first embodiment are represented by comparable reference characters in the drawings, and are not described again.

Figure 5:
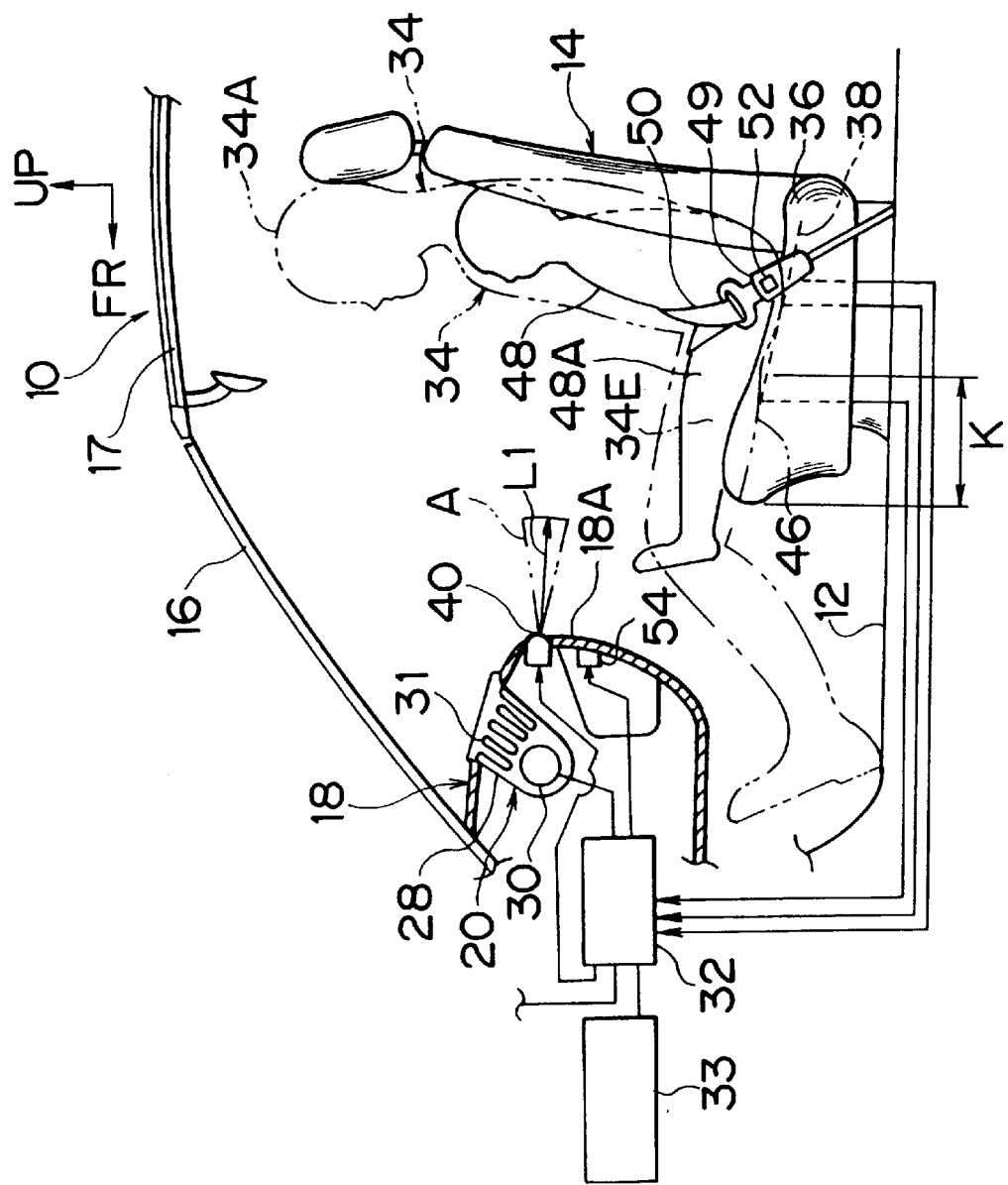
FIG. 5 is a schematic side view illustrating an air bag control system for a passenger seat according to a third embodiment of the invention.
Figure 6:
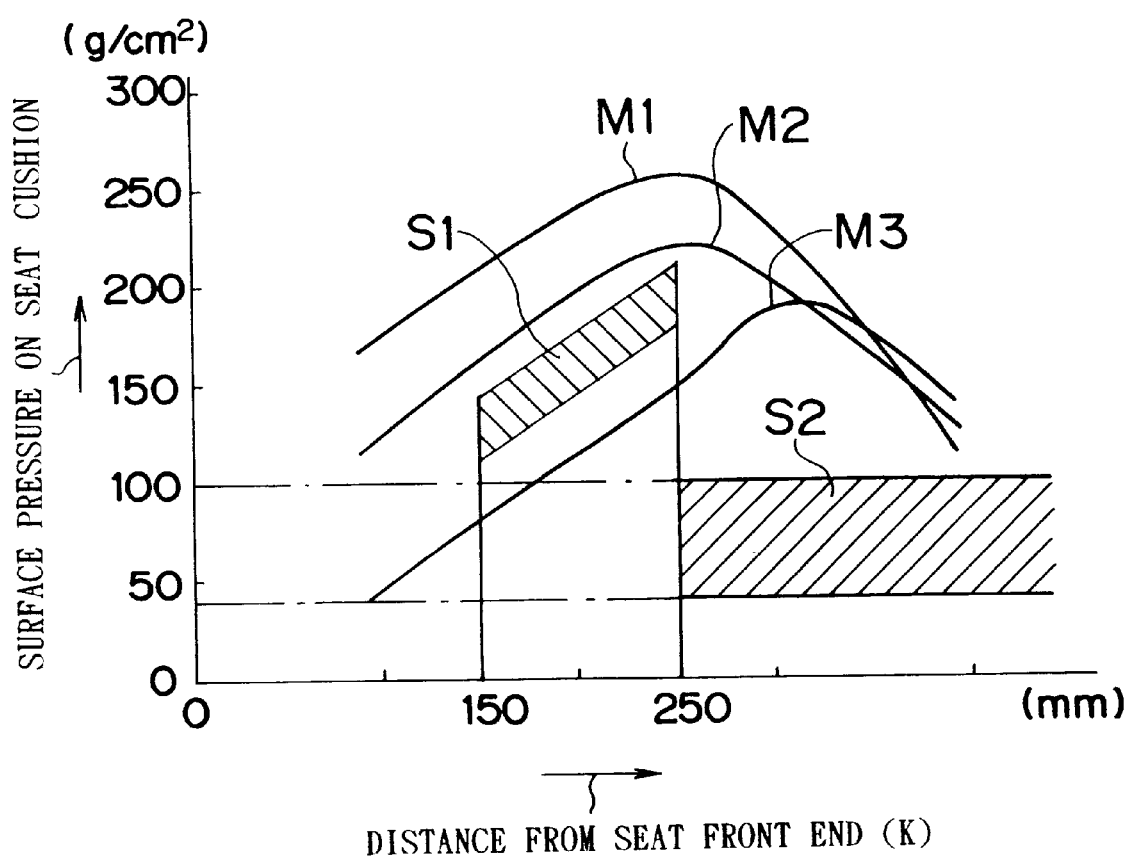
FIG. 6 is a graph indicating a relationship between the distance from a forward end of the seat and the surface pressure on the seat cushion in the air bag control system for a passenger seat according to the third embodiment.

In the FIG. 5 arrangement for air bag control system for a passenger seat according to a third embodiment, an auxiliary seated-state sensor 46 is disposed in a forward portion of the seat cushion 36 of passenger seat 14. The auxiliary seated-state sensor 46, as well as other sensors, is connected to air bag control circuit 32. The auxiliary seated-state sensor 46 is an on/off switch type sensor that switches on based on a detection pressure that is set beforehand. The auxiliary seated-state sensor 46 is disposed in a reverse side of a shell of the seat cushion 36. In order to distinguish an adult 34 from a child 48, the auxiliary seated-state sensor 46 is designed and preset so as to detect a difference between or distinguish the pressures applied to the seat cushion 36 from thigh portion 34E of the adult 34 and thigh portion 48A of the child 48. The preset detection pressure of the auxiliary seated-state sensor 46 is higher than the preset detection pressure of a seated-state sensor 38. In the cases of, for example, a normally-built adult (weighing 60 kg), a lightly-build adult (weighing 40 kg) and a child (weighing 20 kg), the differences between the surface pressures on the seat cushion 36 from the thigh portions of these occupants (the surface pressures at distances of 150–250 mm from the front end of seat cushion 36) are larger than the differences between the surface pressures on the seat cushion 36 from the buttock portions of the occupants (the surface pressures at distances of 250 mm or farther from the front end of the seat cushion 36), as indicated in the graph of FIG. 6. Therefore, it is preferred that the auxiliary seated-state sensor 46 be disposed at a position within the range of 150 mm to 250 mm from the front end of the seat cushion 36 and be preset to a detection pressure within the range of 120 g/cm$^2$ to 180 g/cm$^2$ (that is, within region S1 in the graph of FIG. 6). It is also preferred that the seated-state sensor 38 be disposed at a position at least 250 mm apart from the front end of the seat cushion 36 and be preset to a detection pressure within the range of 40 g/cm$^2$ to 100 g/cm$^2$ (that is, within region S2 in the graph of FIG. 6). Therefore, if the seated-state sensor 38 detects an occupant and the auxiliary seated-state sensor 46 remains off, the air bag control circuit 32 determines that a child 48 is seated in a normal sitting posture on the seat cushion 36. If the seated-state sensor 38 detects an occupant and the auxiliary seated-state sensor 46 is switched on, the air bag control circuit 32 determines that an adult 34 is seated in a normal sitting posture on the seat cushion 36. If the seated-state sensor 38 does not detect an occupant although the auxiliary seated-state sensor 46 is switched on, the air bag control circuit 32 determines that an occupant is seated on the seat cushion 36 but not in the normal sitting posture.

Furthermore, in the third embodiment, an inflator 30 has two gas generator units. In accordance with a control signal from the air bag control circuit 32, the inflator 30 is controlled in one of two pressure modes, that is, a high pressure mode in which the two gas generator units are operated to generate gas, and a low pressure mode in which only one of the gas generator units is operated to generate gas.

The third embodiment further employs a belt-set sensor 52 provided in a seat belt buckle 49, as shown in FIG. 5, for determining whether seat belt 50 is fastened. The belt-set sensor 52 is connected to the air bag control circuit 32. In addition, a buzzer 54 is provided, as an alarm device, in an instrument panel 18. The buzzer 54 is also connected to the air bag control circuit 32. The air bag control circuit 32 is designed to sound the buzzer 54 if the child 48 is in the passenger seat 14, in order to advise that the child 48 be moved to a rear seat.

The operation of the third embodiment is described below.

If the child 48 is seated in the passenger seat 14 as indicated in FIG. 5, the child 48 will likely be moved forward relative to the vehicle 10 at the time of deceleration of the vehicle 10 since the legs of the child 48 are too short to reach the floor surface 12.

Therefore, in the third embodiment, if the seated-state sensor 38 detects an occupant and the auxiliary seated-state sensor 46 is off because the pressure applied to the seat cushion 36 from the thigh portion of the occupant is smaller than a predetermined value, the air bag control circuit 32 determines that the child 48 is seated in the passenger seat 14. At the same time, the air bag control circuit 32 determines whether the seat belt 50 is set on the basis of the signal from the belt-set sensor 52.

When it is determined that the child 48 is seated in the passenger seat 14 and has the seat belt 50 set, the air bag control circuit 32 sets the air bag apparatus 20 in the operable state. When operating the air bag apparatus 20 in this situation, the air bag control circuit 32 controls the inflator 30 in the low pressure mode to reduce the deploying pressure on the air bag 31. If it is determined that the child 48 is seated in the passenger seat 14 but does not have the seat belt 50 set, the air bag control circuit 32 sets the air bag apparatus 20 in the operation prevented state, thereby achieving optimal protection for a child.

Furthermore, in the third embodiment, if it is determined that the child 48 is seated in the passenger seat 14, the air bag control circuit 32 sounds the buzzer 54 to advise that the child 48 should be moved to a rear seat.

Further, if the seated-state sensor 38 detects an occupant and the auxiliary seated-state sensor 46 is on because the pressure applied to the seat cushion 36 from the thigh portion of the occupant is greater than the predetermined value, the air bag control circuit 32 determines that the adult 32 is seated in the passenger seat 14. At the same time, the air bag control circuit 32 determines whether the seat belt 50 is set on the basis of the signal from the belt-set sensor 40.

In a case where it is determined that an adult 34 is seated in the passenger seat 14 and has seat belt 50 fastened, the air bag control circuit 32 controls the inflator 30 in the high pressure mode when the impact sensor 33 detects a deceleration greater than a predetermined value. Controlled in the high pressure mode, the inflator 30 deploys the air bag 31 at a high pressure to protect the head portion 34A of the adult 34 without delay. In a case where it is determined that an adult 34 is seated in the passenger seat 14 but does not have the seat belt 50 fastened, the air bag control circuit 32 operates the inflator 30 in the low pressure mode, thereby achieving optimal protection for an adult.

Therefore, the third embodiment of an air bag control system for a passenger seat is able to distinguish an adult 34 from a child 48 clearly by the combination of the seated-state sensor 38 detecting an occupant and the auxiliary seated-state sensor 46 detecting a difference between or distinguishing the pressure on the seat cushion 36 from the thigh portion of the adult 34 and the pressure from the thigh portion of the child 48. Furthermore, since the preset detection pressure of the auxiliary seated-state sensor 46 is higher than the preset detection pressure of the seated-state sensor 38, distinguishing between the adult 34 and the child 48 is more clearly performed. Since the auxiliary seated-state sensor 46 is an on/off switch that switches on based on the preset detection pressure, the system construction is simplified.

Although the third embodiment employs the buzzer 54 as an alarm device, the buzzer 54 may be replaced by another alarm device, such as an indicator lamp, a display panel or the like.

Fourth Embodiment

An air bag control system for passenger seats according to a fourth embodiment of the invention is now described with reference to FIG. 7.

Members and portions of the fourth embodiment comparable to those of the first embodiment are represented by comparable reference characters, and are not described again.

Figure 7:
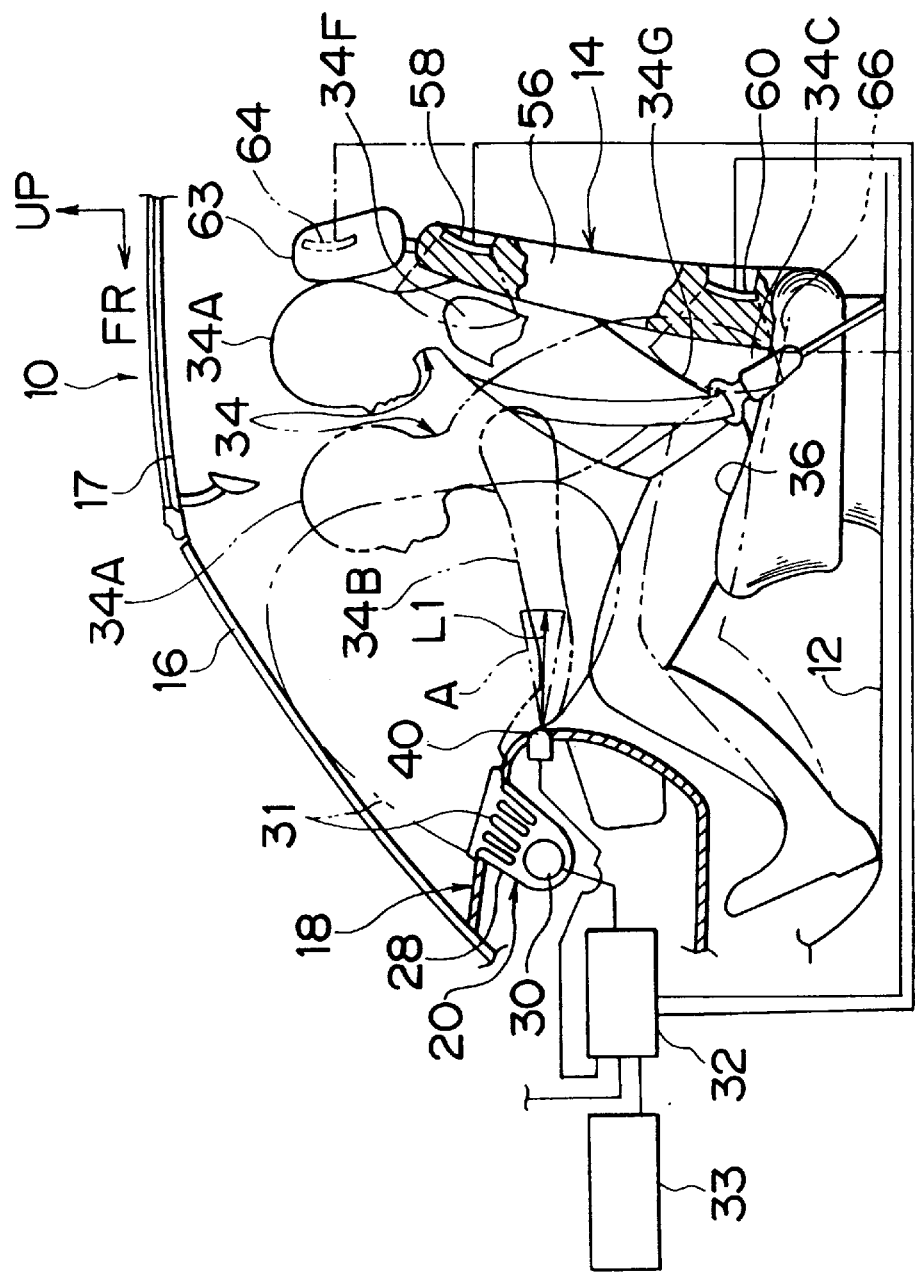
FIG. 7 is a schematic side view illustrating an air bag control system for a passenger seat according to a fourth embodiment of the invention.

In the FIG. 7 arrangement for an air bag control system for a passenger seat according to the fourth embodiment, a shoulder posture detecting sensor 58 is provided in an upper portion of a seat back 56 of a passenger seat 14 for detecting a shoulder portion 34F of an adult 34. A hip-waist posture detecting sensor 60 is provided in a lower portion of the seat back 56 for detecting a hip-waist portion 34G of the adult 34. The shoulder posture detecting sensor 58 and the hip-waist posture detecting sensor 60 are connected to the air bag control circuit 32. Each of the shoulder posture detecting sensor 58 and the hip-waist posture detecting sensor 60 is formed of either an electric capacity type sensor or an electrostatic capacity type sensor that detects the proximity of a body based on disturbance of the electric field around the sensor caused by the presence of the body (containing water). Therefore, the shoulder posture detecting sensor 58 and the hip-waist posture detecting sensor 60 are capable of performing detection even if a cover is placed on the seat back 56.

The detection range of each of the shoulder posture detecting sensor 58 and the hip-waist posture detecting sensor 60 is at most 200 mm, whereby the sensors detect the shoulder portion 34F and the hip-waist portion 34G of the adult 34. The operation of the fourth embodiment is described below.

In the fourth embodiment of an air bag control system for a passenger seat, if the adult 34 is in a normal sitting posture as indicated by a solid line in FIG. 7, the shoulder posture detecting sensor 58 detects the shoulder portion 34F of the adult 34 without a failure. In the normal sitting posture indicated in solid lines, the hip-waist portion 34G of the adult 34 is far apart from the hip-waist posture detecting sensor 60, so that the sensor 60 does not detect the hip-waist portion 34G of the adult 34.

If the air bag control circuit 32 thereby determines that the adult 34 is in the normal sitting posture, the air bag control circuit 32 stops the signal from the proximity sensor 40, that is, turns off the power line to the proximity sensor 40 or ignores the signal from the proximity sensor 40, and sets the air bag apparatus 20 in the operable state. If the adult 34 is in a posture in which the arm 34B is extended to the instrument panel 18 as indicated by a two-dot line in FIG. 7, the shoulder posture detecting sensor 58 does not detect the shoulder portion 34F of the adult 34 since the shoulder portion 34F is far apart from the shoulder posture detecting sensor 58. The hip-waist posture detecting sensor 60 detects the hip-waist portion 34G of the adult 34 since the hip-waist portion 34G is now close to the hip-waist posture detecting sensor 60.

If the hip-waist posture detecting sensor 60 does not detect the hip-waist portion 34G of the adult 34 for a predetermined length of time (about 6 seconds), the air bag control circuit 32 determines that the adult 34 is in the normal sitting posture, and stops the signal from the proximity sensor 40 and sets the air bag apparatus 20 in the operable state. As is apparent from the above description, the fourth embodiment of an air bag control system for a passenger seat is a redundant system in which it can be determined whether the adult is in the normal sitting posture in two separate ways. Therefore, the air bag apparatus 20 can be appropriately controlled.

Furthermore, using the shoulder posture detecting sensor 58 and the hip-waist posture detecting sensor 60, the air bag control circuit 32 detects and distinguishes various sitting postures of the adult 34. Based on the detected sitting posture, the air bag control circuit 32 appropriately controls the air bag apparatus 20.

Although, in the fourth embodiment, the shoulder posture detecting sensor 58 for detecting the shoulder portion 34F of the adult 34 is disposed in an upper portion of the seat back 56 of the passenger seat 14, it is also possible to provide a head posture detecting sensor 64 in a head rest 63 for detecting a head portion 34A of the adult 34, instead of the shoulder posture detecting sensor 58.

Although, in the fourth embodiment, the hip-waist posture detecting sensor 60 for detecting the hip-waist portion 34G of the adult 34 is disposed in a lower portion of the seat back 56, it is also possible to provide a buttock portion detecting sensor 66 in a rear portion of the seat cushion 36, as indicated by a dotted line in FIG. 7, for detecting a buttock portion of the adult 34, instead of the hip-waist posture detecting sensor 60.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements included within the spirit and scope of the appended claims. For example, the seated-state sensor 38 and the auxiliary seated-state sensor 46 may also be disposed in lower portions of the seat cushion 36 or under the seat cushion 36.

What is claimed is:

1. An air big system comprising:

a seated-state detection sensor provided in a seat and configured to detect whether a passenger is seated;

a proximity sensor that detects an object near an air bag apparatus;

an impact sensor that detects a deceleration at the time of an impact; and control means coupled to the detection sensor, the proximity sensor, and the impact sensor, the control means controlling the air bag apparatus to be in an operable state, in which the air bag apparatus can be operated in response to the detection of deceleration by the impact sensor when a predetermined length of time after the seated-state detection sensor detects the seating of an occupant has passed without an object being detected by the proximity sensor.

2. An air bag system according to claim 1, further comprising:

an auxiliary proximity sensor disposed at a forward position in an upper surface of an instrument panel, the forward position being near a windshield pane, the auxiliary proximity sensor having a detection area that extends rearwardly, wherein the control means sets the air bag apparatus to be in an operation prevented state based on inputs from the proximity sensor and the auxiliary proximity sensor, the control means giving a higher priority to the auxiliary proximity sensor than the proximity sensor.

3. An air bag system according to claim 1, further comprising:

a belt-set sensor that detects a set state of a seat belt and outputs a signal indicating whether the seat belt is set; and an inflator controllable to a plurality of pressures including a high pressure and a low pressure, wherein if the control means determines that the seat belt is set on the basis of the signal from the belt-set sensor, the control means controlling the inflator to operate at a pressure higher than a pressure used if the control means determines that the seat belt is not set.

4. An air bag system according to claim 1, further comprising:

an auxiliary seated-state detection sensor provided in a forward portion of a seat cushion; and an inflator controllable to a plurality of pressures including a high pressure and a low pressure, wherein the seated-state detection sensor is provided in a rearward portion of the seat cushion, and wherein if each of the seated-state detection sensor and the auxiliary seated-state detection sensor detects a seated state, the control means determines that an adult is seated on the seat cushion in a normal sitting posture, and operates the inflator at a relatively high pressure, and wherein if the seated-state detection sensor detects a seated-state and the auxiliary seated-state detection sensor does not detect a seated state, the control means determines that a child is seated on the seat cushion in a normal sitting posture, and does one of the following: (A) operates the inflator at a relatively low pressure, (B) prevents operation of the inflator.

5. An air bag system according to claim 4, wherein a set detection pressure of the auxiliary seated-state detection sensor is higher than a set detection pressure of the seated-state detection sensor.

6. An air bag system according to claim 4, wherein the auxiliary seated-state detection sensor is disposed at a position between 150 mm and 250 mm from a forward end of the seat cushion, and a detection pressure of the auxiliary seated-state detection sensor is set to 120 g/cm$^2$–180 g/cm$^2$.

7. An air bag system according to claim 4, further comprising:

an alarm device that is operated by the control means if the control means determines that a child is seated in the normal sitting posture on the seat cushion.

8. An air bag system according to claim 4, further comprising:

a belt-set sensor that detects a fastened state of a seat belt and outputs to the control means a signal indicating whether the seat belt is fastened, wherein if the control means determines that a child is seated in the normal sitting posture on the seat cushion and that the seat belt is fastened, the control means operates the inflator at a relatively low pressure, and wherein the control means prevents operation of the inflator if the control means determines that a child is seated in the normal sitting posture on the seat cushion and that the seat belt is not fastened.

9. An air bag system according to claim 4, further comprising:

a belt-set sensor that detects a fastened state of a seat belt and outputs to the control means a signal indicating whether the seat belt is fastened, wherein if the control means determines that an adult is seated in the normal sitting posture on the seat cushion and that the seat belt is fastened, the control means operates the inflator at a relatively high pressure, and wherein if the control means determines that an adult is seated in the normal sitting posture on the seat cushion and that the seat belt is not fastened, the control means operates the inflator at a relatively low pressure.

10. An air bag system according to claim 4, further comprising a belt-set sensor that detects a fastened state of a seat belt and outputs to the control means a signal indicating whether the seat belt is fastened, wherein the control means controls the inflator such that the inflator is operated at a relatively high pressure only when it is determined by the control means that an adult is seated in the normal sitting posture on the seat cushion and that the seat belt is fastened and, on the basis of a signal from the impact sensor, and that a strong impact has occurred.

11. An air bag system according to claim 1, further comprising:

at least one of a shoulder posture detection sensor provided in an upper portion of a seat back for detecting a shoulder portion of the occupant, and a head posture detection sensor provided in a head rest for detecting a head portion of the occupant, wherein the seated-state detection sensor is formed of at least one of a hip-waist posture detection sensor provided in a lower portion of the seat back for detecting a hip-waist portion of the occupant, and a buttock sensor provided in a rear portion of a seat cushion, for detecting a buttock portion of the occupant, and wherein if any of the shoulder posture detection sensor, the head posture detection sensor, the hip-waist posture detection sensor and the buttock sensor detects the occupant, the control means gives priority to a detection signal from any of the shoulder posture detection sensor, the head posture detection sensor, the hip-waist posture detection sensor and the buttock sensor, over a detection signal from the proximity sensor, and sets the air bag apparatus in the operable state.

12. An air bag system according to claim 11, wherein each of the shoulder posture detection sensor, head posture detection sensor and hip-waist posture detection sensor is one of an electric capacity type sensor and an electrostatic capacity type sensor.

13. An air bag system according to claim 11, wherein under a situation that neither the shoulder posture detection sensor nor the head posture detection sensor makes detection, if the proximity sensor does not make detection for a predetermined length of time after at least one of the hip-waist posture detection sensor and the buttock sensor make detection, the control means determines that the occupant is seated in the normal sitting posture on the seat cushion and performs control such that the air bag apparatus is maintained in the operable state.

14. An air bag system comprising:

a proximity sensor that detects an occupant near an air bag apparatus;

at least one of a shoulder posture detection sensor provided in an upper portion of a seat back for detecting a shoulder portion of the occupant, and a head posture detection sensor provided in a head rest for detecting a head portion of the occupant;

at least one of a hip-waist posture detection sensor provided in a lower portion of the seat back for detecting a hip-waist portion of the occupant, and a buttock sensor provided in a rear portion of a seat cushion for detecting a buttock portion of the occupant; and control means for determining whether the occupant is seated and correspondingly controlling operation of the air bag, on the basis of a combination of a signal from the at least one of the shoulder posture detection sensor and the head posture detection sensor and a signal from the at least one of the hip-waist posture detection sensor and the buttock sensor;

wherein if any of the shoulder posture detection sensor, the head posture detection sensor, the hip-waist posture detection sensor and the buttock sensor detects the occupant, the control means gives priority to the detection signals from the shoulder posture detection sensor, the head posture detection sensor, the hip-waist posture detection sensor and the buttock sensor, over a detection signal from the proximity sensor, and sets the air bag apparatus in an operable state.

15. An air bag system according to claim 14, wherein each of the shoulder posture detection sensor, the head posture detection sensor and the hip-waist posture detection sensor is one of an electric capacity type sensor and an electrostatic capacity type sensor.

16. An air bag system according to claim 14, wherein under a situation that neither the shoulder posture detection sensor nor the head posture detection sensor detects the occupant, if the proximity sensor does not detect the occupant for a predetermined length of time after at least one of the hip-waist posture detection sensor and the buttock sensor detect the occupant, the control means determines that the occupant is seated in the normal sitting posture on the seat cushion and performs control such that the air bag apparatus is maintained in the operable state.

* * * * *